United States Patent
Aoki et al.

(10) Patent No.: US 8,781,701 B2
(45) Date of Patent: Jul. 15, 2014

(54) VEHICLE REGENERATION COOPERATIVE BRAKING SYSTEM

(75) Inventors: Yasushi Aoki, Saitama (JP); Jiro Suzuki, Nagano (JP); Kouji Sakai, Nagano (JP)

(73) Assignees: Honda Motor Co., Ltd., Tokyo (JP); Nissin Kogyo Co., Ltd., Nagano (JP)

( * ) Notice: Subject to any disclaimer, the term of this patent is extended or adjusted under 35 U.S.C. 154(b) by 1572 days.

(21) Appl. No.: 12/075,914

(22) Filed: Mar. 14, 2008

(65) Prior Publication Data

US 2008/0228367 A1 Sep. 18, 2008

(30) Foreign Application Priority Data

Mar. 15, 2007 (JP) ................. 2007-067061

(51) Int. Cl.
| | |
|---|---|
| *B60T 8/00* | (2006.01) |
| *B60T 1/10* | (2006.01) |
| *B60T 13/68* | (2006.01) |
| *B60T 8/36* | (2006.01) |
| *B60T 8/48* | (2006.01) |
| *B60W 30/18* | (2012.01) |
| *B60K 6/48* | (2007.10) |
| *B60W 10/184* | (2012.01) |

(52) U.S. Cl.
CPC ............ *B60T 1/10* (2013.01); *B60W 30/18127* (2013.01); *Y02T 10/6221* (2013.01); *B60K 6/48* (2013.01); *B60T 13/686* (2013.01); *B60T 8/3655* (2013.01); *B60W 10/184* (2013.01); *B60T 8/4872* (2013.01); *B60T 8/4827* (2013.01)
USPC ................... 701/70; 701/78; 701/82; 701/83; 701/91; 303/138; 303/139; 303/152; 303/186; 303/188; 303/28

(58) Field of Classification Search
CPC ............ B60T 8/00; B60T 8/17; B60T 8/173; B60T 8/1755; B60T 8/176; B60T 8/1766
USPC .............. 701/1, 36–48, 70–83, 116; 180/244; 192/215, 216; 137/561, 598
See application file for complete search history.

(56) References Cited

U.S. PATENT DOCUMENTS

| | | | |
|---|---|---|---|
| 5,791,750 A | * | 8/1998 | Spiegelberg .................. 303/191 |
| 5,954,162 A | * | 9/1999 | Feigel et al. ................. 188/72.6 |

(Continued)

FOREIGN PATENT DOCUMENTS

| | | |
|---|---|---|
| JP | 11-098609 | 4/1999 |
| JP | 11-321626 | 11/1999 |

(Continued)

OTHER PUBLICATIONS

Jung et al., "Resistance Estimation of a PWM-Driven Solenoid", International Journal of Automotive Technology, vol. 8, No. 2, pp. 249-258 (2007), Korea.

*Primary Examiner* — Jonathan M Dager
(74) *Attorney, Agent, or Firm* — Carrier Blackman & Associates, P.C.; William D. Blackman; Jeffrey T. Gedeon

(57) ABSTRACT

In a vehicular brake-by-wire braking system, during a four wheel simultaneous control mode when regeneration cooperative braking is implemented, a pair of electromagnetic isolation control valves and one of normally closed electromagnetic pressure relief valves corresponding to regeneration side left and right wheel brakes and normally closed electromagnetic pressure relief valves corresponding to non-regeneration side left and right wheel brakes are caused to operate to open and close, while the other of the normally closed electromagnetic pressure relief valves corresponding to the regeneration side left and right wheel brakes and the normally closed electromagnetic pressure relief valves corresponding to the non-regeneration side left and right wheel brakes are put in de-energized states in which the valves concerned are kept closed, and all normally open electromagnetic pressure supply valves are put in de-energized states in which the valves concerned are kept opened.

6 Claims, 6 Drawing Sheets

(56) References Cited

U.S. PATENT DOCUMENTS

| | | | | |
|---|---|---|---|---|
| 5,979,619 | A * | 11/1999 | Rump | 188/353 |
| 5,984,429 | A * | 11/1999 | Nell et al. | 303/113.4 |
| 6,027,178 | A * | 2/2000 | Oka | 303/11 |
| 6,199,961 | B1 * | 3/2001 | Beck | 303/116.1 |
| 6,206,485 | B1 * | 3/2001 | Feigel et al. | 303/113.5 |
| 6,311,808 | B1 * | 11/2001 | Halasy-Wimmer et al. | 188/72.6 |
| 6,315,370 | B1 * | 11/2001 | Feigel et al. | 303/115.2 |
| 6,338,398 | B1 * | 1/2002 | Eguchi | 188/134 |
| 6,349,995 | B1 * | 2/2002 | Itoh et al. | 303/116.1 |
| 6,354,672 | B1 * | 3/2002 | Nakamura et al. | 303/113.1 |
| 6,412,882 | B1 * | 7/2002 | Isono et al. | 303/114.1 |
| 6,439,674 | B1 * | 8/2002 | Niino | 303/152 |
| 6,499,812 | B1 * | 12/2002 | Gronau et al. | 303/113.1 |
| 7,125,087 | B2 * | 10/2006 | Kobayashi | 303/192 |
| 7,434,669 | B2 * | 10/2008 | Halasy-Wimmer et al. | 188/171 |
| 7,513,577 | B2 * | 4/2009 | Taniguchi et al. | 303/146 |
| 7,654,619 | B2 * | 2/2010 | Knechtges et al. | 303/11 |
| 8,042,886 | B2 * | 10/2011 | Maki et al. | 303/152 |
| 8,548,707 | B2 * | 10/2013 | Witte | 701/70 |
| 2002/0130550 | A1 * | 9/2002 | Roden et al. | 303/113.1 |
| 2003/0193239 | A1 * | 10/2003 | Reuter et al. | 303/122.09 |
| 2003/0217899 | A1 * | 11/2003 | Tanaka | 188/151 A |
| 2004/0135432 | A1 * | 7/2004 | Reuter et al. | 303/152 |
| 2005/0001473 | A1 * | 1/2005 | Messner | 303/89 |
| 2005/0001481 | A1 * | 1/2005 | Kley et al. | 303/191 |
| 2005/0006947 | A1 * | 1/2005 | Messner | 303/11 |
| 2005/0269875 | A1 * | 12/2005 | Maki et al. | 303/152 |
| 2006/0066146 | A1 * | 3/2006 | Otomo | 303/151 |
| 2006/0108861 | A1 * | 5/2006 | Song | 303/20 |
| 2006/0108868 | A1 * | 5/2006 | Ohsaki et al. | 303/154 |
| 2006/0125317 | A1 * | 6/2006 | Kokubo et al. | 303/152 |
| 2006/0220447 | A1 * | 10/2006 | Giers | 303/11 |
| 2007/0194622 | A1 * | 8/2007 | Nakazawa et al. | 303/155 |
| 2007/0228823 | A1 * | 10/2007 | Kokubo et al. | 303/155 |
| 2008/0007116 | A1 * | 1/2008 | Takahashi et al. | 303/113.3 |
| 2008/0100129 | A1 * | 5/2008 | Lubbers | 303/113.1 |
| 2009/0012686 | A1 * | 1/2009 | Maeda et al. | 701/70 |
| 2009/0108672 | A1 * | 4/2009 | Joyce | 303/152 |

FOREIGN PATENT DOCUMENTS

| | | |
|---|---|---|
| JP | 2002-067907 | 3/2002 |
| JP | 2002-087234 | 3/2002 |

* cited by examiner

VEHICLE REGENERATION COOPERATIVE BRAKING SYSTEM

BACKGROUND OF THE INVENTION

1. Field of the Invention

The present invention relates to a vehicle regeneration cooperative braking system which includes a regenerative braking device connected to an axle of one of left and right front wheels and left and right rear wheels and adapted to produce a regenerative braking force by electrical regeneration at the time of braking, a brake hydraulic pressure generating source for generating a brake hydraulic pressure, regeneration side left and right wheel brakes of a hydraulic type which are mounted, respectively, on either of the left and right front wheels and either of the left and right rear wheels, non-generation side left and right wheel brakes of a hydraulic type which are mounted, respectively, on the other of the left and right front wheels and either of the left and right rear wheels, a first hydraulic system brake line including a first common brake line portion which communicates with the brake hydraulic pressure generating source and a pair of first separate brake line portions which branch off the first common brake line portion so as to be connected individually to the regeneration side left wheel brake and the non-regeneration side right wheel brake, a second hydraulic system brake line including a second common brake line portion which communicates with the brake hydraulic pressure generating source and a pair of second separate brake line portions which branch off the second common brake line portion so as to be connected individually to the regeneration side right wheel brake and the non-regeneration side left wheel brake, a pair of normally closed electromagnetic isolation control valves which are provided in positions along the lengths of the first common brake line portion and the second common brake line portion, respectively, normally open electromagnetic pressure supply valves which are individually provided in positions along the lengths of the pair of first separate brake line portions and the pair of second separate brake line portions, respectively, normally closed electromagnetic pressure relief valves which are individually interposed between the respective wheel brakes and a reservoir, and a controller for controlling operations of the regenerative braking device, the electromagnetic isolation control valves, the normally open electromagnetic pressure supply valves and the normally closed electromagnetic pressure relief valves when a regeneration cooperative braking is implemented in which part of a required braking force is obtained by the regenerative braking device.

2. Description of Related Art

A regeneration cooperative braking system is known in Japanese Patent Unexamined Publication JP-A-2002-87234 which includes a first hydraulic system brake line which connects a braking hydraulic pressure generating source with a left front wheel brake and a right rear wheel brake, a second hydraulic system brake line which connects the braking hydraulic pressure generating source with a right front wheel brake and a left rear brake line, a normally open electromagnetic valve which is provided in a position along the length of the first hydraulic system brake line for common use for the left front wheel brake and the right rear wheel brake, a normally open electromagnetic valve which is provided in a position along the length of the second hydraulic system brake line for common use for the right front wheel brake and the left rear wheel brake, normally open electromagnetic pressure supply valves which are provided in positions along the lengths of the first and second hydraulic system brake lines, respectively, in such a manner as to be individually associated with the respective wheel brakes, and normally closed electromagnetic pressure relief valves which are interposed individually between the respective wheel brakes and a reservoir, wherein braking by the wheel brakes and regenerative braking by a regenerative braking device which produces a regenerative braking force by virtue of electrical regeneration are made to cooperate with each other.

In regeneration cooperative braking systems like the one described above, although the hydraulic pressures of the respective wheel brakes can be controlled by combining opening and closing controls of the electromagnetic isolation control valves, as this occurs, the number of operating electromagnetic valves which are caused to operate to open and close through an electric current is desirably made as small as possible with a view to realizing a reduction in operation noise, an increase in durability and a reduction in consumed power.

SUMMARY OF THE INVENTION

The invention has been made in view of these situations, and an object thereof is to provide a vehicle regeneration cooperative braking system which enables the control of hydraulic pressures of left and right front and rear brake wheels by operation of as small a number as possible of electromagnetic valves.

With a view to attaining the object, according to a first aspect of the invention, there is provided a vehicle regeneration cooperative braking system including:

regenerative braking unit connected to an axle of one of left and right front wheels and left and right rear wheels and adapted to produce a regenerative braking force by electrical regeneration at the time of braking;

a brake hydraulic pressure generating source which generates brake hydraulic pressure;

hydraulic regeneration side left and right wheel brakes which are mounted, respectively, on either of the left and right front wheels and either of the left and right rear wheels;

hydraulic non-generation side left and right wheel brakes which are mounted, respectively, on the other of the left and right front wheels and either of the left and right rear wheels;

a first hydraulic system brake line including:
  a first common brake line portion which communicates with the brake hydraulic pressure generating source; and
  a pair of first separate brake line portions which branch off the first common brake line portion so as to be connected individually to the regeneration side left wheel brake and the non-regeneration side right wheel brake;

a second hydraulic system brake line including:
  a second common brake line portion which communicates with the brake hydraulic pressure generating source; and
  a pair of second separate brake line portions which branch off the second common brake line portion so as to be connected individually to the regeneration side right wheel brake and the non-regeneration side left wheel brake;

a pair of normally closed electromagnetic isolation control valves which are provided in positions along the lengths of the first common brake line portion and the second common brake line portion, respectively;

normally open electromagnetic pressure supply valves which are individually provided in positions along the lengths of the pair of first separate brake line portions and the pair of second separate brake line portions, respectively;

normally closed electromagnetic pressure relief valves which are individually interposed between the respective wheel brakes and a reservoir; and a controller which controls operations of the regenerative braking unit, the electromagnetic isolation control valves, the normally open electromagnetic pressure supply valves and the normally closed electromagnetic pressure relief valves when implementing a regeneration cooperative braking in which part of required braking force is obtained by the regenerative braking unit; wherein in a four wheels simultaneous control mode in which hydraulic pressures to the regeneration side left and right wheel brakes and the non-regeneration side left and right wheel brakes are controlled simultaneously when the regeneration cooperative braking is implemented, the controller operates such that:

opening and closing the pair of electromagnetic isolation control valves and one of the normally closed electromagnetic pressure relief valves corresponding to the regeneration side left and right wheel brakes and the normally closed electromagnetic pressure relief valves corresponding to the non-regeneration side left and right wheel brakes to put them in an energized state;

keeping the other of the normally closed electromagnetic pressure relief valves corresponding to the regeneration side left and right wheel brakes and the normally closed electromagnetic pressure relief valves corresponding to the non-regeneration side left and right wheel brakes closed to put them in a de-energized state; and keeping the normally open electromagnetic pressure supply valves opened to put it in the de-energized state.

According to a second aspect of the invention, there is provided the vehicle regeneration cooperative braking system as set forth in the first aspect of the invention, in a front and rear braking pressure distribution control mode in which a braking pressure is distributed between the front wheels and the rear wheels when the regeneration cooperative braking is implemented, for increasing or decreasing hydraulic pressures of the regeneration side left and right wheel brakes, the controller may operate such that:

opening and closing the normally open electromagnetic pressure supply valves corresponding to the non-regeneration side left and right wheel brakes and the normally closed electromagnetic pressure relief valves corresponding to the non-regeneration side left and right wheel brakes to put them in the de-energized states; and opening and closing the pair of electromagnetic isolation control valves, the normally open electromagnetic pressure supply valves and corresponding to the regeneration side left and right wheel brakes and the normally closed electromagnetic pressure relief valves corresponding to the regeneration side left and right wheel brakes to put them in the energized state.

According to a third aspect of the invention, there is provided the vehicle regeneration cooperative braking system as set forth in the second aspect of the invention, in the front and rear braking pressure distribution control mode, in response to an increase in regenerative braking force by the regenerative braking unit, the controller may operate such that:

closing the pair of electromagnetic isolation control valves and the normally open electromagnetic pressure supply valves corresponding to the regeneration side left and right wheel brakes; and opening and closing the normally closed electromagnetic pressure relief valves corresponding to the regeneration side left and right wheel brakes.

According to a fourth aspect of the invention, there is provided the vehicle regeneration cooperative braking system as set forth in the second aspect of the invention, when the hydraulic pressure of the regeneration side left and right wheel brakes is lower than the hydraulic pressure of the non-regeneration side left and right wheel brakes in the front and rear braking pressure distribution control mode, the controller may open and close the pair of electromagnetic isolation control valves and the normally open electromagnetic pressure supply valves corresponding to the regeneration side left and right wheel brakes in response to a decrease in regenerative braking force by the regenerative braking unit.

According to a fifth aspect of the invention, there is provided the vehicle regeneration cooperative braking system as set forth in the fourth aspect of the invention, when the hydraulic pressure of the regeneration side left and right wheel brakes becomes equal to the hydraulic pressure of the non-regeneration side left and right wheel brakes, in response to opening of the normally open electromagnetic pressure supply valves corresponding to the regeneration side left and right wheel brakes, the controller may operate such that:

putting all the normally open electromagnetic pressure supply valves and all the normally closed electromagnetic pressure relief valves in the de-energized state; and opening and closing the pair of electromagnetic isolation control valves to put them in the energized state.

According to a sixth aspect of the invention, there is provided the vehicle regeneration cooperative braking system as set forth in the first aspect of the invention, in a front and rear braking pressure distribution control mode in which a braking pressure is distributed between the left and rear front wheels and the left and right rear wheels when the regeneration cooperative braking is implemented, for increasing hydraulic pressure of the non-regeneration side left and right wheel brakes, the controller may operate such that:

keeping the normally open electromagnetic pressure supply valves corresponding to the non-regeneration side left and right wheel brakes and the normally closed electromagnetic pressure relief valves corresponding to the non-regeneration side left and right wheel brakes in the de-energized states;

closing the normally open electromagnetic pressure supply valves corresponding to the regeneration side left and right wheel brakes; and opening and closing the pair of electromagnetic isolation control valves.

According to the first aspect of the invention, the electromagnetic isolation control valves and one of the normally closed electromagnetic pressure relief valves corresponding to the regeneration side left and right wheel brakes and the normally closed electromagnetic pressure relief valves corresponding to the non-regeneration side left and right wheel brakes are opened and closed to put them in the energized state, all the normally opened electromagnetic valves are kept opened to put them in the de-energized state and the other of the normally closed electromagnetic pressure relief valves corresponding to the regeneration side left and right wheel brakes and the normally closed electromagnetic pressure relief valves corresponding to the non-regeneration side left and right wheel brakes is kept closed to put it in the de-energized state.

Thus, a regeneration cooperative braking control can be implemented while making the brake hydraulic pressures of the four wheels equal to one another. In addition, among the pair of electromagnetic isolation control valves, the four normally open electromagnetic pressure supply valves and the four normally closed electromagnetic pressure relief valves, only the pair of electromagnetic isolation control valves and the two normally closed electromagnetic pressure relief valves are caused to operate, whereby a minimum number of electromagnetic valves are made to operate. Therefore, it becomes possible to realize a reduction in operating noise, an increase in durability and a reduction in consumed power.

According to the second aspect of the invention, in the front and rear braking pressure distribution control mode when the regeneration cooperative braking is implemented, the hydraulic pressures of the regeneration side left and right wheel brakes, which are either of the front and rear wheel brakes, can be increased or decreased by operating the pair of electromagnetic isolation control valves to open and close and operating the normally open electromagnetic pressure supply valves and the normally closed electromagnetic pressure relief valves corresponding to the regeneration side left and right wheel brakes.

Therefore, it becomes possible to implement the front and rear braking pressure distribution control. Moreover, since the normally open electromagnetic pressure supply valves and the normally closed electromagnetic pressure relief valves corresponding to the non-regeneration side left and right wheel brakes are held in the de-energized states when increasing and decreasing the hydraulic pressures of the regeneration side left and right wheel brakes, only a minimum number of electromagnetic valves are caused to be operated in the front and rear braking pressure distribution control mode.

According to the third aspect of the invention, in the front and rear braking pressure distribution control mode, by closing the pair of electromagnetic isolation control valves and the normally open electromagnetic pressure supply valves corresponding to the regeneration side left and right wheel brakes and opening the normally closed electromagnetic pressure relief valves corresponding to the regeneration side left and right wheel brakes in response to the increase in the regenerative braking force by the regenerative braking device, the braking pressure of the regeneration side left and right wheel brakes can be decreased in response to the increase in regenerative braking force.

According to the fourth aspect of the invention, in the front and rear braking pressure distribution control mode, when the regenerative braking force by the regenerative braking device turns to decreasing when the brake hydraulic pressure of the regenerative side left and right wheel brakes becomes lower than the brake hydraulic pressure of the non-regeneration side left and right wheel brakes, by causing the pair of electromagnetic isolation control valves and the normally open electromagnetic pressure supply valves corresponding to the regeneration side left and right wheel brakes to operate to open and close, the brake hydraulic pressure of the regeneration side left and right wheel brake can be increased so as to compensate for the reduction in the regenerative braking force.

According to the fifth aspect of the invention, when the brake hydraulic pressure of the regeneration side left and right wheel brakes turns to decreasing in response to opening of the normally open electromagnetic pressure supply valves corresponding to the regeneration side left and right wheel brakes to thereby become equal to the brake hydraulic pressure of the non-regeneration side left and right wheel brakes, the hydraulic pressures of all the four wheel brakes can be increased in response to a decrease in regenerative braking force by putting all the normally open electromagnetic pressure supply valves and normally closed electromagnetic pressure relief valves in the de-energized states and causing the pair of electromagnetic isolation control valves to operate to open and close simultaneously.

Furthermore, according to the sixth aspect of the invention, in the front and rear braking pressure distribution control mode when the regeneration cooperative braking is implemented in a state where the output hydraulic pressure from the brake hydraulic pressure generating source is sufficiently high, the hydraulic pressure of the non-regeneration side left and right wheel brakes can be increased by keeping the normally opened electromagnetic valves and the normally closed electromagnetic pressure relief valves corresponding to the non-regeneration side left and right wheel brakes in the de-energized states, closing the normally open electromagnetic pressure supply valves corresponding to the regeneration side left and right wheel brakes and controlling the pair of electromagnetic isolation control valves to open and close. Due to this, it becomes possible to control the front and rear braking pressure distribution.

DETAILED DESCRIPTION OF THE PREFERRED EMBODIMENTS

Hereinafter, a mode for carrying out the invention will be described based on embodiments of the invention which are shown in the accompanying drawings.

Figure 1:
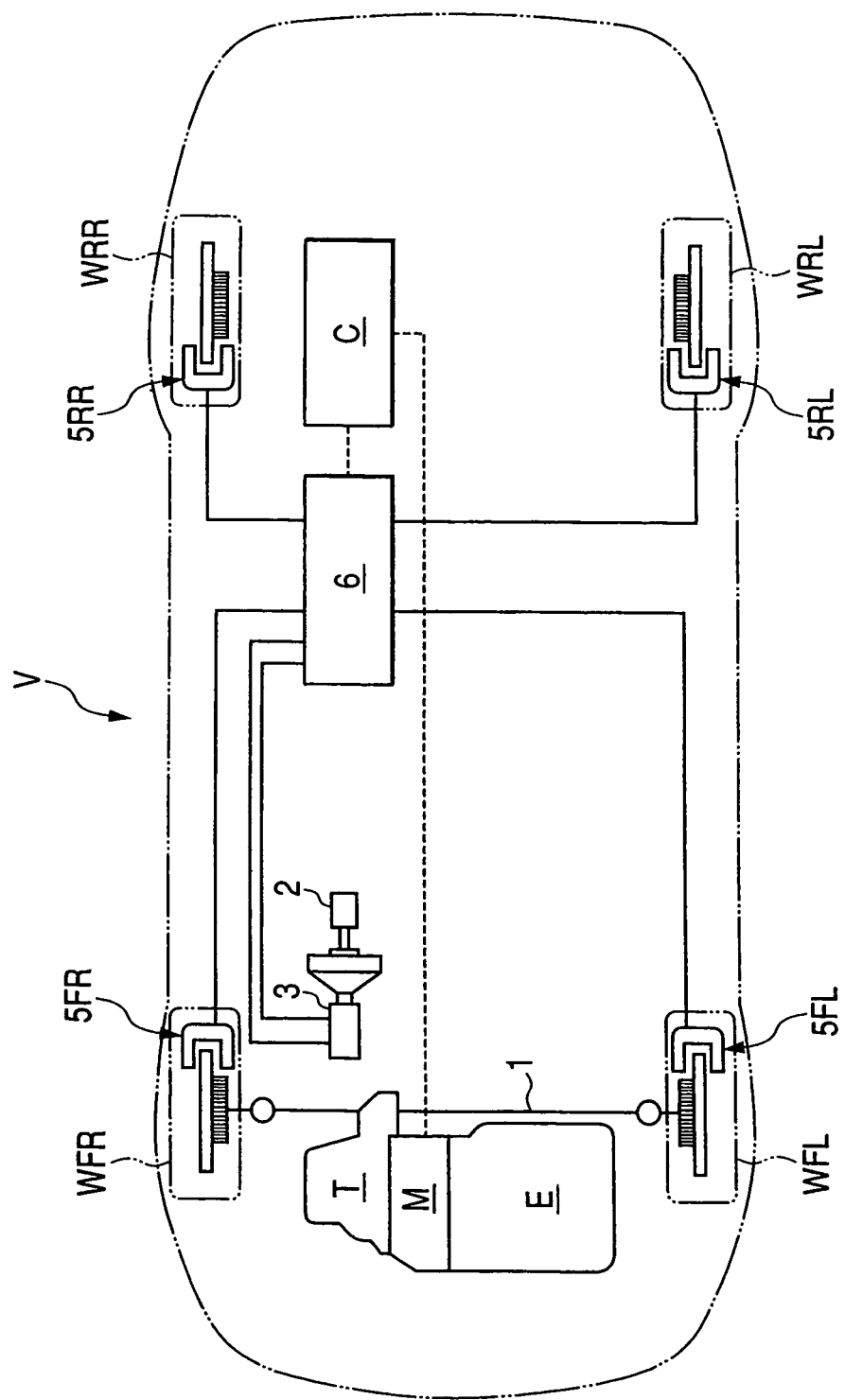
FIG. 1 is a drawing showing a drive line and brake lines of a vehicle according to a first embodiment.
Figure 2:
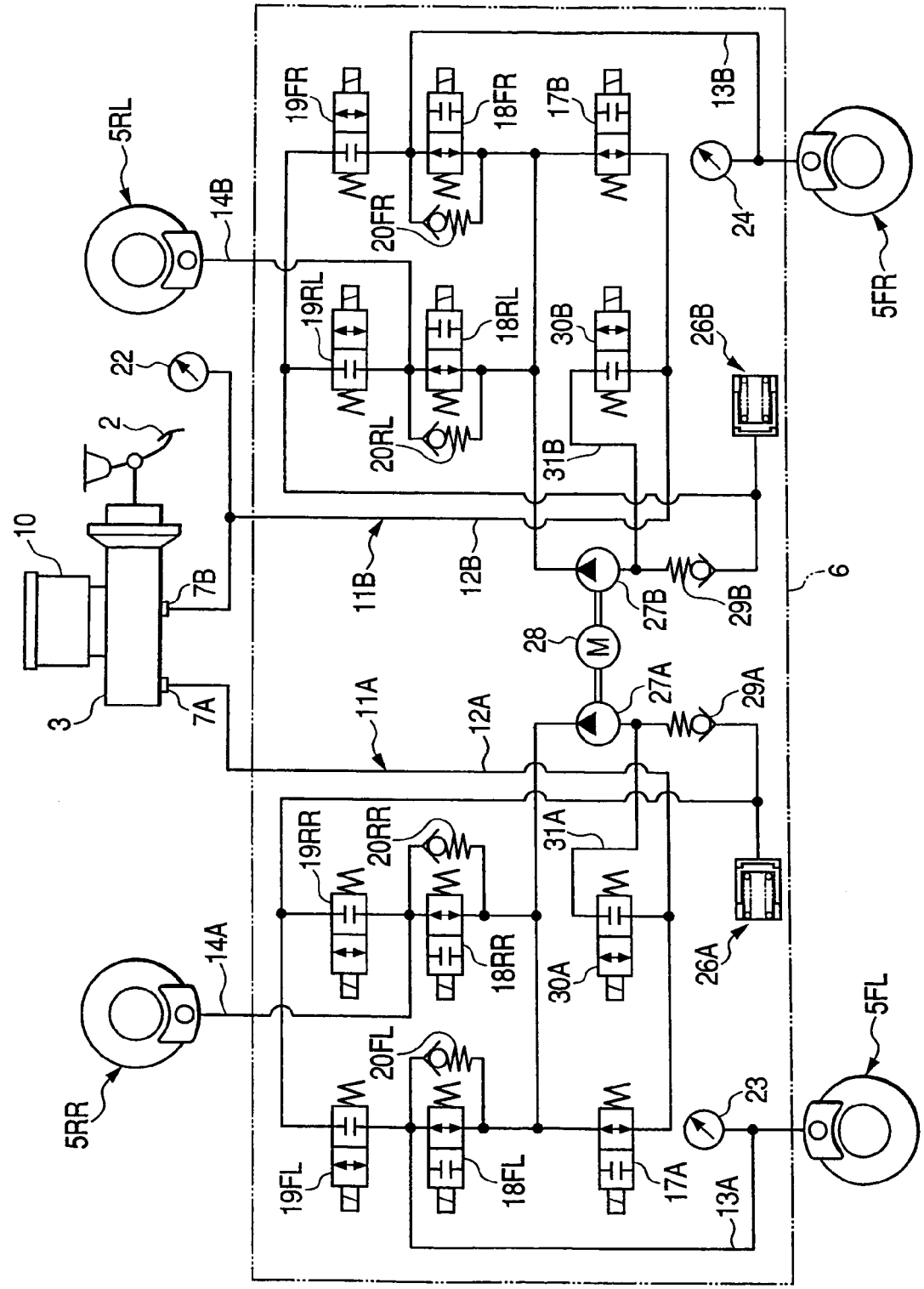
FIG. 2 is a drawing showing the configuration of a brake system.
Figure 3:
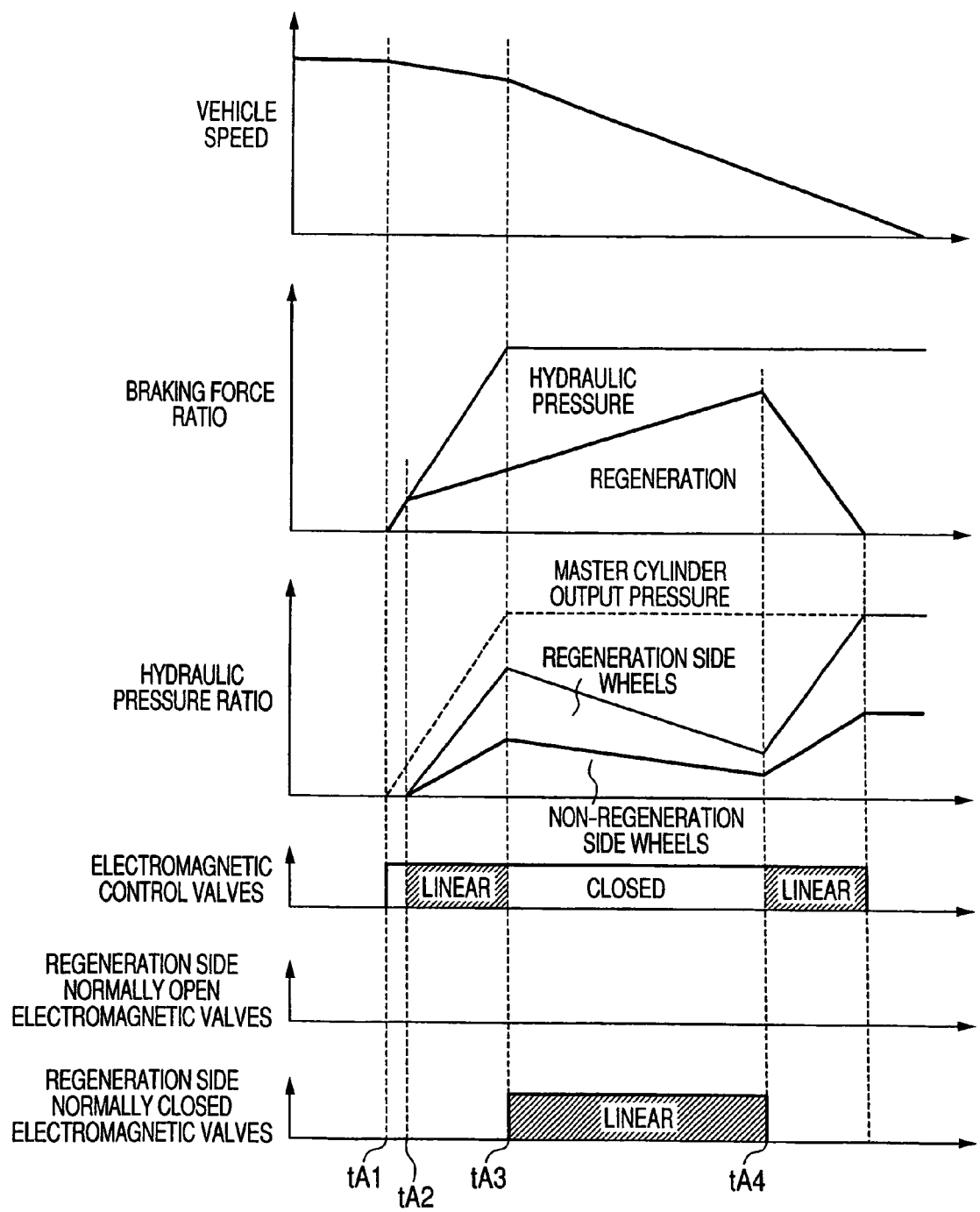
FIG. 3 is a timing chart resulting in a four wheel simultaneous control mode when a regeneration cooperative braking is implemented.
Figure 4:
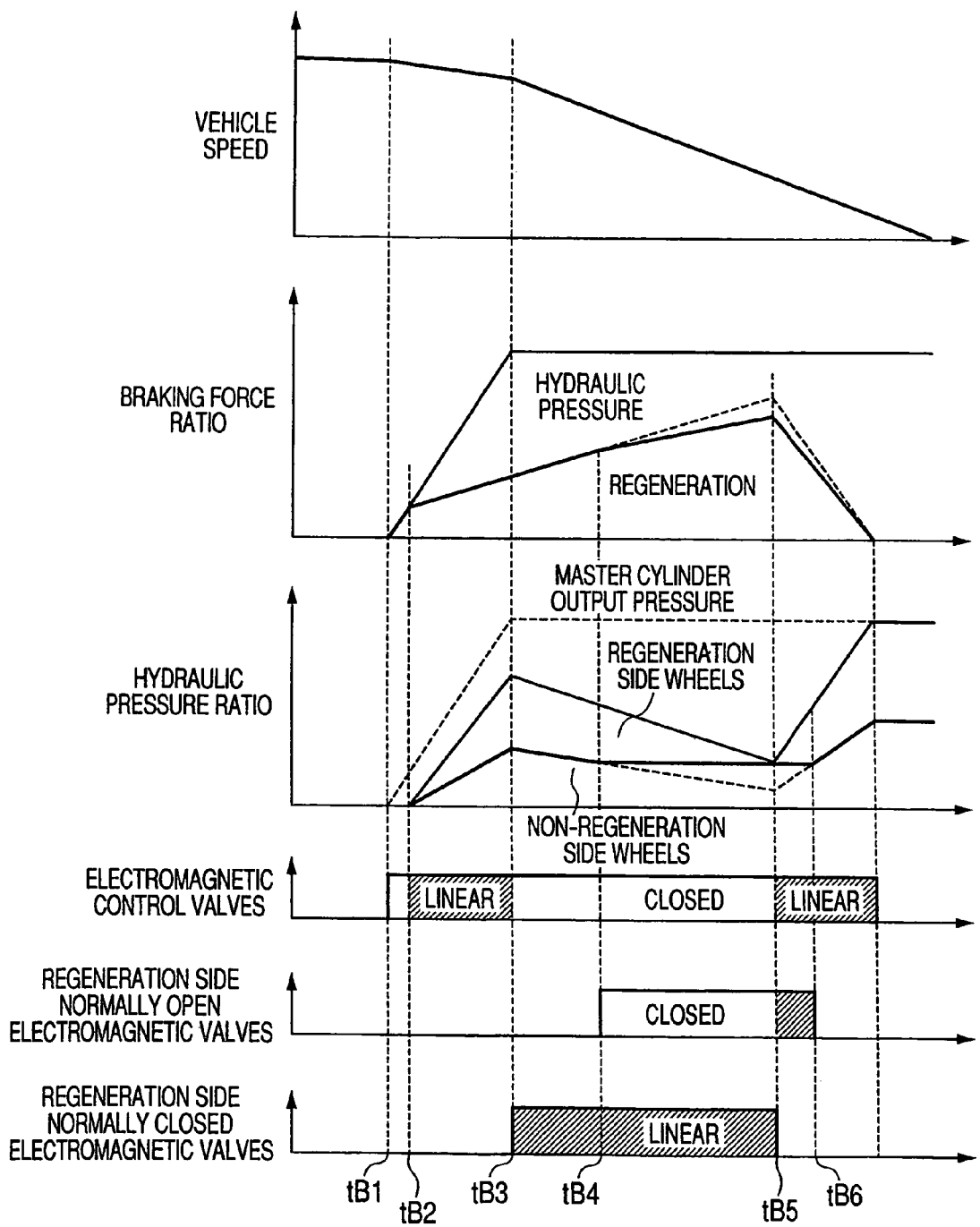
FIG. 4 is a timing chart resulting in a front and rear braking pressure distribution control mode when the regeneration cooperative braking is implemented.

FIGS. 1 to 4 are such as to show a first embodiment, of which FIG. 1 is a drawing showing a drive line and brake lines of a vehicle, FIG. 2 is a drawing showing the configuration of a braking system, FIG. 3 is a timing chart in a four wheel simultaneous control mode when a regeneration cooperative braking is implemented and FIG. 4 is a timing chart in a front and rear braking pressure distribution control mode when the regeneration cooperative braking is implemented.

Firstly, in FIG. 1, a vehicle V described herein is a hybrid vehicle which includes left and right front wheels WFL, WFR, which are driving wheels, left and right rear wheels WRL, WRR, which are driven wheels, an engine E, an electric motor M and a transmission T. When the vehicle V is driven normally, a driving force is transmitted from the engine E to an axle 1 of the left and right front wheels WFL, WFR via the transmission T, and as required, a driving force of the electric motor M is used to assist the driving force of the engine E, or only the driving force of the electric motor M is allowed to be transmitted to the axle 1 so as to drive the left and right front wheels WFL, WFR. Moreover, the electric motor M is such as to function as a regenerative braking device for producing a regenerative braking force by electrical regeneration when the brakes are applied, and electric power generated by the electric motor M when it functions as the regenerative braking device is stored in a battery, not shown.

Regeneration side left and right wheel brakes 5FL, 5FR of a hydraulic type are mounted on the left and right front wheels WFL, WFR at ends of the axle 1 to which the electric motor M is connected, and non-regeneration side left and right wheel brakes 5RL, 5RR of a hydraulic type are mounted on the left and right rear wheels WRL, WRR, these wheel brakes 5FL, 5FR, 5RL, 5RR being, for example, disc brakes.

A brake fluid pressure or hydraulic pressure control circuit 6 is connected individually to the wheel brakes 5FL, 5FR, 5RL, 5RR in such a way that when a hydraulic pressure outputted from a master cylinder 3, which is a braking hydraulic pressure generating source, in response to a depressing operation of a brake pedal 2 is inputted into the brake hydraulic pressure control circuit 6, which controls the hydraulic pressure outputted from the master cylinder 3 to control hydraulic pressures applied individually to the wheel brakes 5FL, 5FR, 5RL, 5RR. Moreover, the operation of the electric motor M and the operation of the brake hydraulic pressure control circuit 6 are controlled by a controller C.

In FIG. 2, the master cylinder 3 is configured into a tandem type in which first and second output ports 7A, 7B are provided which are each adapted to output a hydraulic pressure according to a depressing operation of the brake pedal 2.

The first output port 7A of the master cylinder 3 is connected to the regeneration side left wheel brake 5FL and the non-regeneration side right wheel brake 5RR via a first hydraulic system brake line 11A. The second output port 7B of the master cylinder 3 is connected to the regeneration side right wheel brake 5FR and the non-regeneration side left wheel brake 5RL via second hydraulic system brake line 11B.

The first hydraulic system brake line 11A is made up of a first common brake line portion 12A which communicates with the first output port 7A and a pair of separate brake line portions 13A, 14A which branch off the first common brake line portion 12A so as to be individually connected to the regeneration side left wheel brake 5FL and the non-regeneration side right wheel brake 5RR. The second hydraulic system brake line 11B is made up of a second common brake line portion 12B which communicates with the second output port 7B of the master cylinder 3 and a pair of second separate brake line portions 13B, 14B which branch off the second common brake line portion 12B so as to be individually connected to the regeneration side right wheel brake 5FR and the non-regeneration side left wheel brake 5RL.

The brake hydraulic pressure circuit 6 includes:

a pair of normally closed electromagnetic isolation control valves 17A, 17B which are provided, respectively, in positions along the lengths of the first and second common brake line portions 12A, 12B of the first and second hydraulic system brake lines 11A, 11B which communicate with the master cylinder 3, normally open electromagnetic pressure supply valves 18FL, 18RR, 18FR, 18RL which are provided, respectively, in positions of the lengths of the pair of first separate brake line portions 13A, 14A and the pair of second separate brake line portions 13B, 14B, normally closed electromagnetic pressure relief valves 19FL, 19RR which are interposed between the regeneration side left wheel brake 5FL and the non-regeneration side right wheel brake 5RR and a reservoir 26A, normally closed electromagnetic pressure relief valves 19FR, 19RL which are interposed between the regeneration side right wheel brake 5RL and the non-regeneration side left wheel brake 5RL and a reservoir 26B, check valves 20FL, 20RR, 20FR, 20RL which are connected parallel, respectively, to the normally open electromagnetic pressure supply valves 18FL, 18RR, 18FR, 18RL in such a manner as to permit individual passages of brake fluid from the side of the wheel brakes 5FL, 5RR, 5FR, 5RL, first and second hydraulic pumps 27A, 27B which are connected, respectively, to the reservoirs 26A, 26B via check valves 29A, 29B on a suction side thereof and are connected, respectively, to positions lying between the electromagnetic isolation control valves 17A, 17B of the first and second hydraulic system brake lines 11A, 11B and the normally open electromagnetic pressure supply valves 18FL, 18RR, 18FR, 18RL on a discharge side thereof, and suction valves 30A, 30B which are normally closed electromagnetic pressure relief valves provided, respectively, in positions along the lengths of suction lines 31A, 31B which branch off positions lying upstream of the electromagnetic isolation control valves 17A, 17B of the common brake line portions 12A, 12B of the first and second hydraulic system brake lines 11A, 11B so as to be connected, respectively, to positions lying between the hydraulic pumps 27A, 27B and the check valves 29A, 29B.

The first and second hydraulic pumps 27A, 27B are driven by a single common electric motor 28.

Thus, the electromagnetic isolation control valves 17A, 17B of the first and second hydraulic system brake lines 11A, 11B are normally closed electromagnetic valves which can control linearly hydraulic pressures on output sides, that is, sides towards the first and second separate brake line portions 13A, 14A; 13B, 14B.

In addition, in the normally open electromagnetic pressure supply valves 18FL, 18RR, 18FR, 18FL, the normally open electromagnetic pressure supply valves 18FL, 18FR corresponding to the regeneration side left and right wheel brakes 5FL, 5FR are electromagnetic valves which can control linearly hydraulic pressures on output sides, that is, hydraulic pressures to the regeneration side left and right wheel brakes 5FL, 5FR.

In the normally closed electromagnetic pressure relief valves 19FL, 19RR, 19FR, 19RL, the normally closed electromagnetic pressure relief valves 19FL, 19FR corresponding to the regeneration side left and right wheel brakes 5FL, 5FR are electromagnetic valves which can control linearly hydraulic pressures on input sides, that is, hydraulic pressures to the regeneration side left and right wheel brakes 5FL, 5FR.

A hydraulic pressure outputted from the master cylinder 3 is detected by a first hydraulic pressure sensor 22, a hydraulic pressure of the regeneration side left wheel brake 5FL is detected by a second hydraulic pressure sensor 23, and a hydraulic pressure of the regeneration side right wheel brake 5FR is detected by a third hydraulic pressure sensor 24.

Incidentally, at the time of regeneration cooperative braking in which part of required braking force is obtained by the electric motor M, the operations of the electric motor M, the solenoid vales 17A, 17B; 21A, 21B, the normally open electromagnetic pressure supply valves 18FL, 18RR, 18FR, 18RL and the normally closed electromagnetic pressure relief valves 19FL, 19RR, 19FR, 19RL are controlled by the controller C. Hydraulic pressures which results from adjusting a hydraulic pressure outputted from the master cylinder 3 in the brake hydraulic pressure control circuit 6 under the control of the controller C are made to be applied individually to the wheel brakes 5FL, 5FR, 5RL, 5RR.

In a four wheel simultaneous control mode in which hydraulic pressures are supplied to the regeneration side left and right wheel brakes 5FL, 5FR and to the non-regeneration side left and right wheel brakes 5RL, 5RR at the time of regeneration cooperative braking while the brakes are applied, speed, braking force ratio and hydraulic pressure ratio change as is shown in FIG. 3 according to the control of respective operating states of the constituent elements of the brake hydraulic pressure control circuit 6, and in the electromagnetic isolation control valves 17A, 17B, the normally open electromagnetic pressure supply valves 18FL, 18RR, 18FR, 18RL and the normally closed electromagnetic pressure relief valves 19FL, 19RR, 19FR, 19RL, the valves which are not shown in FIG. 3 remain in de-energized states. In addition, in FIG. 3, in portions which indicate operating states of the valves, shaded portions with oblique lines indicate linearly controlled states, while portions left blank or in white indicate de-energized states or, where so labeled, closed states, and this will be true also in FIGS. 4 and 5, which will be described later.

When the brakes are started to be applied at time tA1 in FIG. 3, the electromagnetic isolation control valves 17A, 17B enter closed states, and a regenerative braking is started by the electric motor M.

Following this, at time tA2, which is subsequent directly to time tA1, the electromagnetic isolation control valves 17A, 17B are controlled linearly to enter a state in which they are operated to open and close. As this occurs, all the normally closed electromagnetic pressure relief valves 19FL, 19RR, 19FR, 19RL are in the de-energized states while being kept in closed states and all the normally open electromagnetic pressure supply valves 18FL, 18RR, 18FR, 18RR are also in the de-energized states while kept in open states, brake hydraulic pressures to the regeneration side left wheel brake 5FL and the non-regeneration side right wheel brake 5RR on the side of the first hydraulic system brake line 11A and brake hydraulic pressures to the regeneration side right wheel brake 5FR and the non-regeneration side left wheel brake 5RL on the side of the second hydraulic system brake line 11B all become equal. Accordingly, the hydraulic pressures to all the four wheels continue to increase while keeping hydraulic pressure ratios on the regeneration side and the non-regeneration side equal by the linear control of the electromagnetic isolation control valves 17A, 17B.

At time tA3 when output pressure of the master cylinder 3 passes through a pressure increasing process to reach a constant value, the electromagnetic isolation control valves 17A, 17B enter the closed state, and the normally closed electromagnetic pressure relief valves 19FL, 19FR corresponding to the regeneration side left front and right front wheel brakes 5FL, 5FR are controlled linearly to be caused to start to operate to open and close, whereby the brake hydraulic pressures to all the four wheels are decreased while keeping the hydraulic pressure ratios on the regeneration side and the non-regeneration side equal.

Then, at time tA4 when the regenerative braking force generated by the electric motor M turns to decreasing in response to a decrease in vehicle speed, the normally closed electromagnetic pressure relief valves 19FL, 19FR corresponding to the regeneration side left and right wheel brakes 5FL, 5FR are shifted to the de-energized states while being kept in the closed states, whereby the electromagnetic isolation control valves 17A, 17B are controlled linearly to be caused to start to open and close, and the brake hydraulic pressures to the four wheel brakes are increased while keeping the hydraulic pressures on the regeneration side and the non-regeneration side equal in response to a reduction in the regenerative braking force by the electric motor M.

Namely, in the four wheel simultaneous control mode, the controller C controls the pair of electromagnetic isolation control valves 17A, 17B and the normally closed electromagnetic valve 19FL, 19FR corresponding to the regeneration side left and right wheel brakes 5FL, 5FR to open and close and puts the normally closed electromagnetic pressure relief valves 19RL, 19RR corresponding to the non-regeneration side left and right wheel brakes 5RL, 5RR in the de-energized states in which the valves concerned are kept closed while putting all the normally open electromagnetic pressure supply valves 18FL, 18RR, 18FR, 18RL in the de-energized states in which the valves concerned are kept open.

Next, a control in a front and rear braking pressure distribution control mode where a braking pressure is distributed between the left and right front wheels WFL, WFR and the left and right rear wheels WRL, WRR will be described by reference to FIG. 4.

The operating states of the electromagnetic isolation control valves 17A, 17B and the operating states of the normally closed electromagnetic pressure relief valves 19FL, 19FR corresponding to the regeneration side left and right wheel brakes 5FL, 5FR remain the same as those shown in FIG. 3 from time tB1 to time tB3, and the normally open electromagnetic pressure supply valves 18FR, 18RL and the normally closed electromagnetic pressure relief valves 19FR, 19RL corresponding to the non-regeneration side left and right wheel brakes 5RL, 5RR remain in the de-energized states as in the case with the four wheel simultaneous control mode.

When the regenerative braking force by the electric motor M reaches a certain value or a value higher than that at time tB4 which is subsequent to time tB3, the normally open electromagnetic pressure supply valves 18FL, 18FR corresponding to the regeneration side left and right wheel brakes 5FL, 5FR are caused to operate to close while keeping the pair of the electromagnetic isolation control valves 17A, 17B in the closed states and the normally closed electromagnetic pressure relief valves 19FL, 19FR corresponding to the regeneration side left and right wheel brakes 5FL, 5FR in the states in which the valves concerned are linearly controlled to be caused to operate to open and close.

Due to this, the brake hydraulic pressures to the non-regeneration side left and right wheel brakes 5RL, 5RR are kept as they are, whereas the brake hydraulic pressures to the regeneration side left and right wheel brakes 5FL, 5FR are decreased, whereby the hydraulic pressure ratio on the non-regeneration side becomes higher than the hydraulic pressure ratio on the regeneration side, and the brake hydraulic pressures to the non-regeneration side left and right wheel brakes 5RL, 5RR are kept as they are. Consequently, a part of the braking force produced by hydraulic pressure of the total braking force is increased when compared with the portion thereof resulting in the four wheel simultaneous control mode in the brake hydraulic pressure decreasing process.

The brake hydraulic pressure of the regeneration side left and right wheel brakes 5FL, 5FR becomes lower than the brake hydraulic pressure of the non-regeneration side left and right wheel brakes 5RL, 5RR due to the decrease in brake hydraulic pressure of the regeneration side left and right wheel brakes 5FL, 5FR.

However, at time tB5 when the regenerative braking force by the electric motor M starts to decrease due to a decrease in vehicle speed in that state, the pair of electromagnetic isolation control valves 17A, 17B are started to be controlled linearly to be caused to operate to open and close, the normally closed electromagnetic pressure relief valves 19FL, 19FR corresponding to the regeneration side left and right wheel brakes 5FL, 5FR stop to operate to open and close so as to enter the de-energized states while kept in the closed states, furthermore, the normally open electromagnetic pressure supply valves 18FL, 18FR corresponding to the regeneration side left and right wheel brakes 5FL, 5FR are started to be controlled linearly to thereby be caused to operate to open and close. Due to this, the brake hydraulic pressures to the regeneration side left and right wheel brakes 5FL, 5FR turn to increasing, so as to compensate for the decrease in the regenerative braking force by the electric motor M.

Following this, at time tB6 when the hydraulic pressure of the regeneration side left and right wheel brakes 5FL, 5FR becomes equal to the hydraulic pressure of the non-regeneration side left and right wheel brakes 5RL, 5RR in response to the increase in the hydraulic pressures to the regeneration side wheel brakes 5FL, 5FR which resulted in response to the opening or closing operations of the normally open electromagnetic pressure supply valves 18FL, 18FR, the pair of electromagnetic isolation control valves 17A, 17B are controlled linearly so as to be caused to operate to open and close while keeping the normally open electromagnetic pressure supply valves 18FL, 18FR and the normally closed electromagnetic pressure relief valves 19FL, 19FR corresponding to the regeneration side left and right wheel brakes 5FL, 5FR in the de-energized states, whereby the brake hydraulic pressures of the four wheels are caused to increase.

Namely, in the front and rear braking pressure distribution control mode, the controller C keeps the normally open electromagnetic pressure supply valves 18RL, 18RR and the normally closed electromagnetic pressure relief valves 19RL, 19RR corresponding to the non-regeneration side left and right wheel brakes 5RL, 5RR in the de-energized states and controls the pair of electromagnetic isolation control valves 17A, 17B and the normally open electromagnetic pressure supply valves 18FL, 18FR and the normally closed electromagnetic pressure relief valves 19FL, 19FR corresponding to the regeneration side left and right wheel brakes 5FL, 5FR to open and close, so as to decrease the hydraulic pressures to the regeneration side left and right wheel brakes 5FL, 5FR.

In addition, in response to an increase in regenerative braking force by the electric motor M in the front and rear braking force distribution control mode, the controller C closes the normally open electromagnetic pressure supply valves 18FL, 18FR corresponding to the regeneration side left and right wheel brakes 5FL, 5FR and causes the normally closed electromagnetic pressure relief valves 19FL, 19FR corresponding to the regeneration side left and right wheel brakes 5FL, 5FR to operate to open and close. When the hydraulic pressure of the regeneration side left and right wheel brakes 5FL, 5FR is lower than the hydraulic pressure of the non-regeneration side left and right wheel brakes 5RL, 5RR, the controller C causes the normally open electromagnetic pressure supply valves 18FL, 18FR corresponding to the regeneration side wheel brakes 5FL, 5FR to operate to open and close in response to the decrease in regenerative braking force by the electric motor M. Furthermore, the controller C puts all the normally open electromagnetic pressure supply valves 18F, 18FR, 18RL, 18RR and all the normally closed electromagnetic pressure relief valves 19FL, 19FR, 19RL, 19RR in the de-energized states and causes the pair of electromagnetic isolation control valves 17A, 17B to operate to open and close when the hydraulic pressure of the regeneration side wheel brakes 5FL, 5FR becomes equal to the hydraulic pressure of the non-regeneration side wheel brakes 5RL, 5RR in response to the opening of the normally open electromagnetic pressure supply valves 18FL, 18FR corresponding to the regeneration side left and right wheel brakes 5FL, 5FR.

Next, the function of the first embodiment will be described. In the four wheel simultaneous control mode when the regeneration cooperative braking is implemented, the controller C controls the pair of electromagnetic isolation control valves 17A, 17B and the normally closed electromagnetic pressure relief valves 19FL, 19FR corresponding to the regeneration side left and right wheel brakes 5FL, 5FR to open and close and puts all the normally open electromagnetic pressure supply valves 18FL, 18FR, 18RL, 18RR in the de-energized states in which the valves concerned are kept open while keeping the normally open electromagnetic pressure supply valves 19RL, 19RR corresponding to the non-regeneration side wheel brakes 5RL, 5RR opened to put it in the de-energized states, so as to implement the regeneration cooperative braking control while keeping the braking pressures of the four wheels equal to each other. As this occurs, in the pair of electromagnetic isolation control valves 17A, 17B, the four normally open electromagnetic pressure supply valves 18FL, 18FR, 18RL, 18RR and the four normally closed electromagnetic pressure relief valves 19FL, 19FR, 19RL, 19RR, only the pair of electromagnetic isolation control valves 17A, 17B and the normally closed electromagnetic pressure relief valves 19FL, 19FR corresponding to the regeneration side left and right wheel brakes 5FL, 5FR are caused to operate, and this makes a minimum number of electromagnetic valves to be operated, thereby making it possible to realize a reduction in operating noise, an increase in durability and a reduction in consumed power.

In addition, in the front and rear braking pressure distribution control mode when the regeneration cooperative braking is implemented, the controller C keeps the normally open electromagnetic pressure supply valves 18RL, 18RR and the normally closed electromagnetic pressure relief valves 19RL, 19RR corresponding to the non-regeneration side wheel brakes 5RL, 5RR in the de-energized states and causes the pair of electromagnetic isolation control valves 17A, 17B and the normally open electromagnetic pressure supply valves 18FL, 18FR and the normally closed electromagnetic pressure relief valves 19FL, 19FR corresponding to the regeneration side left and right wheel brakes 5FL, 5FR to operate to open and close, so as to increase or decrease the hydraulic pressures to the regeneration side left and right wheel brakes 5FL, 5FR. Therefore, the controller C can control the front and rear braking force distribution by increasing or decreasing the hydraulic pressures to the regeneration side left and right wheel brakes 5FL, 5FR which constitute either of the front and rear wheel brakes and can make a minimum number of electromagnetic valves to be operated in the front and rear braking pressure distribution control mode by keeping the normally open electromagnetic pressure supply valves 18RL, 18RR and the normally closed electromagnetic pressure relief valves 19RL, 19RR corresponding to the non-regeneration side left and right wheel brakes 5RL, 5RR in the de-energized states.

Moreover, in the front and rear braking pressure distribution control mode, the controller C closes the pair of electromagnetic isolation control valves 17A, 17B and the normally open electromagnetic pressure supply valves 18FL, 18FR corresponding to the regeneration side left and right wheel brakes 5FL, 5FR and causes the normally closed electromagnetic pressure relief valves 19FL, 19FR corresponding to the regeneration side left and right wheel brakes 5FL, 5FR to operate to open and close in response to an increase in regenerative braking force by the electric motor M. Accordingly, the braking pressures of the regeneration side left and right wheel brakes 5FL, 5FR can be decreased in response to the increase in regenerative braking force.

In addition, in the front and rear braking force distribution control mode, when the hydraulic pressure of the regeneration side left and right wheel brakes 5FL, 5FR is lower than the hydraulic pressure of the non-regeneration side left and right wheel brakes 5RL, 5RR, the controller C causes the pair of electromagnetic isolation control valves 17A, 17B and the normally open electromagnetic pressure supply valves 18FL, 18FR corresponding to the regeneration side left and right wheel brakes 5FL, 5FR to operate to open and close in response to a decrease in regenerative braking force by the electric motor M, to thereby increase the hydraulic pressure of the regeneration side left and right wheel brakes 5FL, 5FR so as to compensate for the decrease in regenerative braking force.

Furthermore, when the hydraulic pressure of the regeneration side left and right wheel brakes 5FL, 5FR becomes equal to the hydraulic pressure of the non-regeneration side left and right wheel brakes 5RL, 5RR in response to the opening of the normally open electromagnetic pressure supply valves 18FL, 18FR corresponding to the regeneration side wheel brakes 5FL, 5FR, since the controller C puts all the normally open electromagnetic pressure supply valves 18FL, 18FR, 18RL, 18RR and all the normally closed electromagnetic pressure relief valves 19FL, 19FR, 19RL, 19RR in the de-energized states and causes the pair of electromagnetic isolation control valves 17A, 17B to operate to open and close, the hydraulic pressures to all the four wheel brakes 5FL, 5FR, 5RL, 5RR can be increased in response to the decrease in regenerative braking force.

Figure 5:
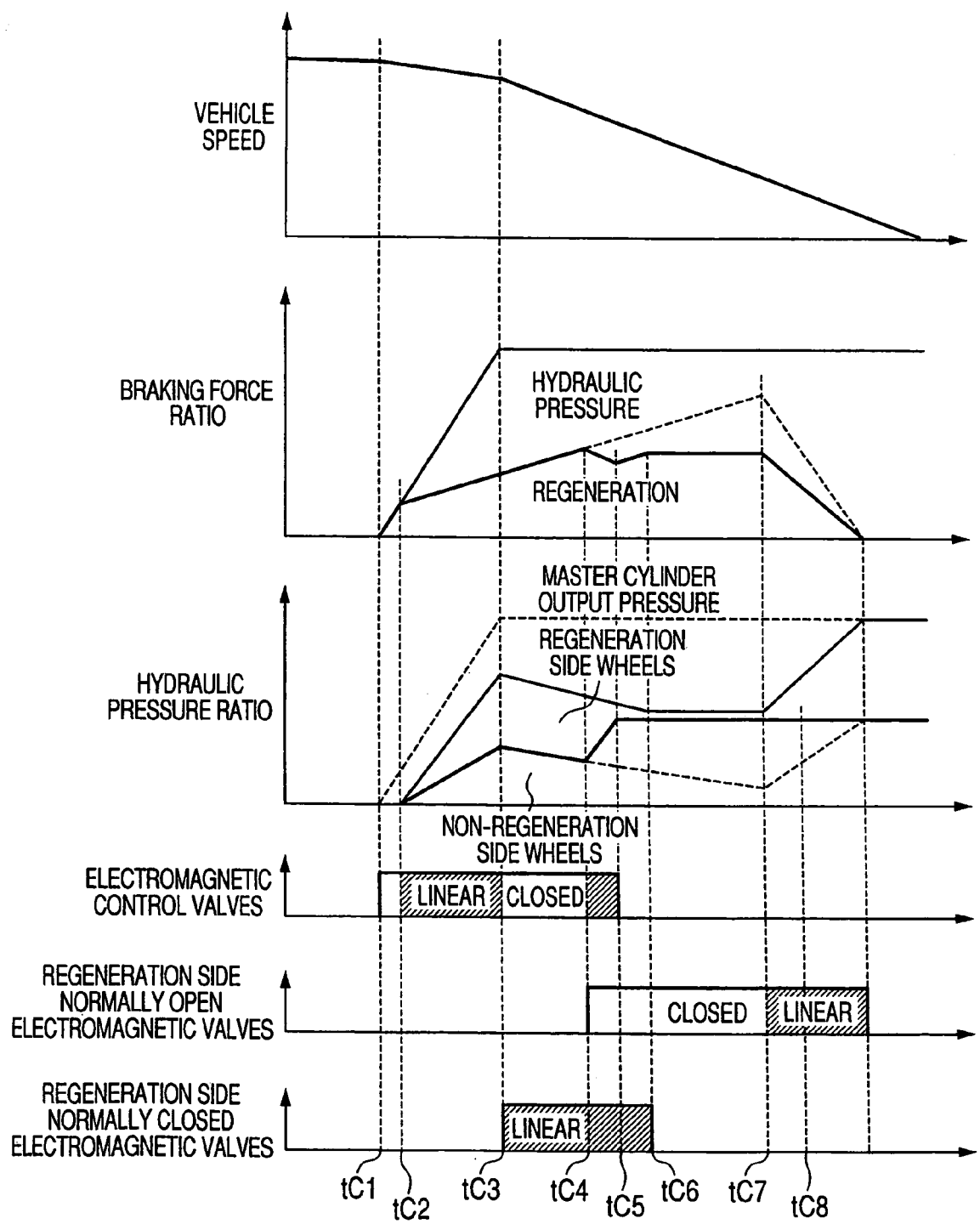
FIG. 5 is a timing chart resulting in a front and rear braking force distribution control mode when a regeneration cooperative braking is implemented according to a second embodiment.

Incidentally, the control in the front and rear braking pressure distribution control mode in which the braking pressure is distributed between the left and right front wheels WFL, WFR and the left and right rear wheels WRL, WRR may be executed according to a timing chart in FIG. 5 which is a second embodiment of the invention.

In FIG. 5, from time tC1 to time tC3, operating states of electromagnetic isolation control valves 17A, 17B and operating states of normally closed electromagnetic pressure relief valves 19FL, 19FR corresponding to regeneration side left and right wheel brakes 5FL, 5FR remain the same as those from time tB1 to time tB3 in FIG. 4 in the first embodiment, and normally open electromagnetic pressure supply valves 18RL, 18RR and normally closed electromagnetic pressure relief valves 19RL, 19RR corresponding to non-regeneration side left and right wheel brakes 5RL, 5RR remain in de-energized states as in the case with the four wheel simultaneous control mode.

When a regenerative braking force by an electric motor M reaches a certain value or a value higher than that at time tC4 which is subsequent to time tC3, the pair of electromagnetic isolation control valves 17A, 17B are controlled linearly so as to be caused to operate to open and close, normally open electromagnetic pressure supply valves 18FL, 18FR corresponding to the regeneration side left and right wheel brakes 5FL, 5FR are caused to operate to close, and the normally closed electromagnetic pressure relief valves 19FL, 19FR corresponding to the regeneration side left and right wheel brakes 5FL, 5FR are controlled linearly so as to continue operating to open and close. Accordingly, brake hydraulic pressures to the non-regeneration side wheel brakes 5RL, 5RR are increased, whereas brake hydraulic pressures to the regeneration side wheel brakes 5FL, 5FR are decreased, and a hydraulic pressure ratio on the regeneration side becomes higher than a hydraulic pressure ratio on the non-regeneration side. In addition, since the brake hydraulic pressures to the non-regeneration side wheel brakes 5RL, 5RR are increased, a portion of a braking force by hydraulic pressure of the total braking force is increased when compared with a portion of the same resulting in a brake hydraulic pressure decreasing process in a four wheel simultaneous control mode.

Although the brake hydraulic pressure of the regeneration side left and right wheel brakes 5FL, 5FR becomes lower than the brake hydraulic pressure of the non-regeneration side wheel brakes 5RL, 5RR due to the increase in brake hydraulic pressures to the non-regeneration side left and right wheel brakes 5RL, 5RR, at time tC5 which is subsequent to time tC4, the electromagnetic isolation control valves 17A, 17B are closed, and the brake hydraulic pressures to the non-regeneration side wheel brakes 5RL, 5RR are kept as they are.

Furthermore, at time tC6, the normally closed electromagnetic pressure relief valves 19FL, 19FR corresponding to the regeneration side left and right wheel brakes 5FL, 5FR are closed, whereby the brake hydraulic pressures to the regeneration side left and right wheel brakes 5FL, 5FR are kept as they are. Consequently, the hydraulic pressure ratio on the non-regeneration side is maintained to be higher than the hydraulic pressure ratio on the regeneration side.

Following this, at time C7 at which the regenerative braking force by the electric motor M starts to decrease as the vehicle speed decreases, the pair of electromagnetic isolation control valves 17A, 17B are controlled linearly so as to be caused to start operating to open and close, whereby the brake hydraulic pressures to the regeneration side wheel brakes 5FL, 5FR turn to increase, so as to compensate for the decrease in regenerative braking force by the electric motor M.

Namely, in the front and rear braking pressure distribution control mode, the controller C keeps the normally open electromagnetic pressure supply valves 18RL, 18RR and the normally closed electromagnetic pressure relief valves 19RL, 19RR corresponding to the non-regeneration side wheel brakes 5RL, 5RR in the de-energized states and controls the pair of electromagnetic isolation control valves 17A, 17B to open and close while closing the normally open electromagnetic pressure supply valves 18FL, 18FR corresponding to the regeneration side left and right wheel brakes 5FL, 5FR, whereby the hydraulic pressures to the non-regeneration side left and right wheel brakes 5RL, 5RR which constitutes either of the front and rear wheel brakes can be increased. Moreover, in this second embodiment, the normally closed electromagnetic pressure relief valves 19FL, 19FR corresponding to the regeneration side left and right wheel brakes 5FL, 5FR are controlled to open and close so as to decrease the hydraulic pressures to the regeneration side left and right wheel brakes 5FL, 5FR, thereby making it possible to control the front and rear braking pressure distribution control.

Figure 6:
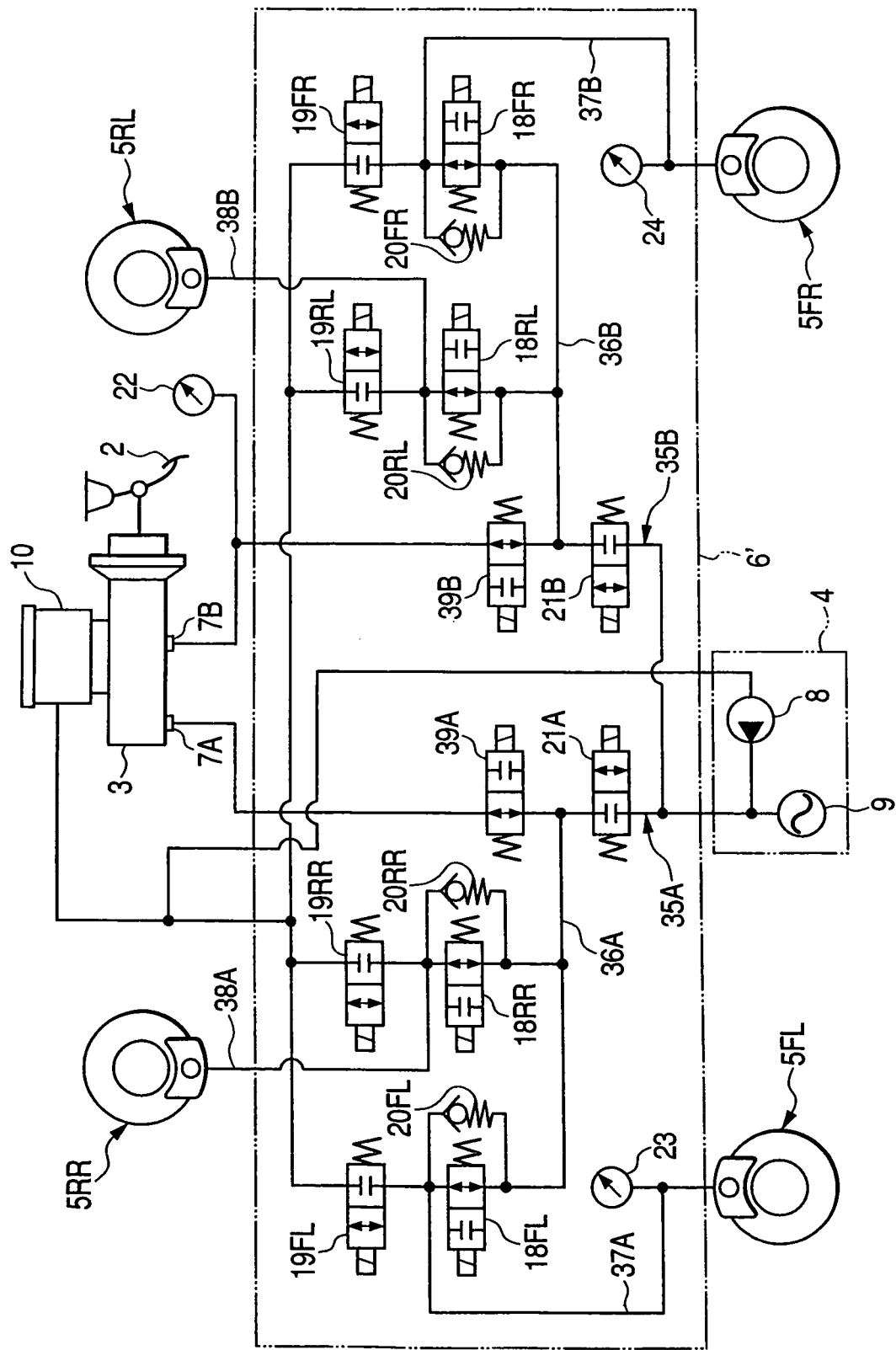
FIG. 6 is a drawing showing the configuration of a brake system according to a third embodiment.

FIG. 6 is such as to show a third embodiment of the invention, which is simply illustrated by imparting like reference numerals to like constituent portions to those of the first embodiment, and the detailed description thereof will be omitted.

A brake fluid pressure or hydraulic pressure control circuit 6' is connected individually to a regeneration side left wheel brake 5FL, a non-regeneration side left wheel brake 5RL, a regeneration side right wheel brake 5FR and a non-regeneration side right wheel brake 5RR, in such a manner that hydraulic pressures outputted from first and second output ports 7A, 7B of a master cylinder 3 in response to a depressing operation of a brake pedal 2 when a non-regeneration operative braking is implemented are inputted into the brake hydraulic pressure control circuit 6', and hydraulic pressures which result from the controlling of the brake hydraulic pressures from the master cylinder 3 in the brake hydraulic pressure control circuit 6' are applied individually to the wheel brakes 5FL, 5FR, 5RL, 5RR.

In addition, this braking system includes a braking hydraulic pressure generating source 4 for outputting braking hydraulic pressure when the brakes are applied, the braking hydraulic pressure generating source 4 also so operating at the time of automatic braking. The braking hydraulic pressure generating source 4 is made up of a hydraulic pump 8 which discharges a brake fluid drawn from a reservoir 10 attached to the master cylinder 3 and an accumulator 9 which accumulates hydraulic pressures outputted from the hydraulic pump 8, and this braking hydraulic pressure generating source 4 is also connected to the brake hydraulic pressure control circuit 6'.

The braking hydraulic pressure generating source 4 is connected to the regeneration side left wheel brake 5FL and the non-regeneration side right wheel brake 5RR via a first hydraulic system brake line 35A and is connected to the regeneration side right wheel brake 5FR and the non-generation side left wheel brake 5RL via a second hydraulic system brake line 35B. Then, the first hydraulic brake line 35A is made up of a first common brake line portion 36A which communicates with the accumulator 9 of the braking hydraulic pressure generating source 4 and a pair of first separate brake line portions 37A, 38A which branch off the first common brake line portion 36A so as to be connected individually to the regeneration side left wheel brake 5FL and the non-regeneration side right wheel brake 5RR, while the second hydraulic brake line 35B is made up of a second common brake line portion 36B which communicates with the accumulator 9 of the braking hydraulic pressure generating source 4 and a pair of second separate brake line portions 37B, 38B which branch off the second common brake line portion 36B so as to be connected individually to the regeneration side right wheel brake 5FR and the non-regeneration side left wheel brake 5RL.

The brake hydraulic pressure control circuit 6' includes a pair of electromagnetic isolation control valves 21A, 21B which are provided, respectively, in positions along the lengths of the first and second common brake line portions 36A, 36B of the first and second hydraulic system brake lines 35A, 35B which communicate with the braking hydraulic pressure generating source 4, normally open solenoid vales 18FL, 18RR; 18FR, 18RL which are provided, respectively, in positions along the lengths of the pairs of first and second separate brake line portions 37A, 38A; 37B, 38B, normally closed electromagnetic pressure relief valves 19FL, 19RR which are interposed, respectively, between the regeneration side left wheel brake 5FL and the non-regeneration side right wheel brake 5RR and the reservoir 10, normally closed electromagnetic pressure relief valves 19FR, 19RL which are interposed, between the regeneration side right wheel brake 5FR and the reservoir 10, and between the non-regeneration side left wheel brake 5RL and the reservoir 10, check valves 20FL, 20RR, 20FR, 20RL which are connected parallel, respectively, to the normally open electromagnetic pressure supply valves 18FL, 18RR, 18FR, 18RR in such a manner as to permit, respectively, passages of brake fluid from sides thereof lying to face the wheel brakes 5FL, 5RR, 5FR, 5RL, and cut-off valves 39A, 39B made up, respectively, of cut-off valves which are interposed, respectively, between the first and second output ports 7A, 7B of the master cylinder 3 and the pairs of first and second separate brake line portions 37A, 38A; 37B, 38B.

In the brake hydraulic pressure control circuit 6' configured as has been described above, by actuating first and second hydraulic pumps 27A, 27B by closing the electromagnetic isolation control valves 21A, 21B and opening the cut-off valves 39A, 39B, increasing, keeping and decreasing pressures to the wheel brakes 5FL, 5RR, 5FR, 5RL can be controlled when the brakes are not applied.

In addition, when the brakes (including in the sense of the automatic braking) are applied, when the hydraulic pump 8 is actuated and the cut-off valves 39A, 39B are closed, by controlling the operations of the electromagnetic isolation control valves 21A, 21B, the normally open electromagnetic pressure supply valves 18FL, 18RR, 18FR, 18RL and the normally closed electromagnetic pressure relief valves 19FL, 19RR, 19FR, 19RL in a similar way to those of the first and second embodiments, a regeneration cooperative braking can be controlled, and also according to the third embodiment, only a minimum number of electromagnetic valves are made to be operated, thereby making it possible to realize a reduction in operating noise, an increase in durability and a reduction in consumed power.

While the embodiments of the invention have been described heretofore, the invention is not such as to be limited thereto but can be modified variously without departing from the spirit and scope of the invention which are described in the claims.

For example, while in the embodiments, the electric motor M which transmits its driving force to the axle 1 of the left and right front wheels WFL, WFR is described as being applied to the regenerative braking device, a regenerative braking device such as a generator adapted only to obtain a regenerative braking force may be used, and as this occurs, the regenerative braking device may be connected to either an axle of drive wheels or an axle of driven wheels.

In addition, while in the embodiments, the electromagnetic isolation control valves 17A, 17B; 21A, 21B and the normally open electromagnetic pressure supply valves 18FL, 18FR and the normally closed electromagnetic pressure relief valves 19FL, 19FR corresponding to the regeneration side left and right wheel brakes 5FL, 5FR are made to constitute the electromagnetic valves which can be controlled linearly, they may be solenoid opening and closing valves.

Furthermore, while in the embodiments, in the four wheel simultaneous control mode, the normally closed electromagnetic pressure relief valves 19FL, 19FR corresponding to the regeneration side left and right wheel brakes 5FL, 5FR are caused to operate to open and close and the normally closed electromagnetic pressure relief valves 19RL, 19RR corresponding to the non-regeneration side left and right wheel brakes 5RL, 5RR are kept closed to put in the de-energized states, a configuration may be adopted in which the normally closed electromagnetic pressure relief valves 19RL, 19RR corresponding to the non-regeneration side left and right wheel brakes 5RL, 5RR are caused to operate to open and close and the normally closed electromagnetic pressure relief valves 19FL, 19FR corresponding to the regeneration side left and right wheel brakes 5FL, 5FR are put in the de-energized states where the valves concerned are kept closed.

What is claimed is:

1. A vehicle regeneration cooperative braking system comprising:
    a regenerative braking unit connected to an axle of one of left and right front wheels and left and right rear wheels and adapted to produce a regenerative braking force by electrical regeneration at the time of braking;
    a brake hydraulic pressure generating source which generates brake hydraulic pressure;
    left and right regeneration-side hydraulic wheel brakes which are mounted, respectively, on either of the left and right front wheels and either of the left and right rear wheels;
    left and right non-regeneration-side hydraulic wheel brakes which are mounted, respectively, on the other of the left and right front wheels and either of the left and right rear wheels;
    a first hydraulic system brake line comprising:
        a first common brake line portion which communicates with the brake hydraulic pressure generating source; and
        a pair of first separate brake line portions which branch off the first common brake line portion so as to be connected individually to the regeneration side left wheel brake and the non-regeneration side right wheel brake;
    a second hydraulic system brake line comprising:
        a second common brake line portion which communicates with the brake hydraulic pressure generating source; and
        a pair of second separate brake line portions which branch off the second common brake line portion so as to be connected individually to the regeneration side right wheel brake and the non-regeneration side left wheel brake;
    a pair of normally closed electromagnetic isolation control valves which are provided in positions along the lengths of the first common brake line portion and the second common brake line portion, respectively;
    a plurality of normally open electromagnetic pressure supply valves which are individually provided in positions along the lengths of each one of the pair of first separate brake line portions and each one of the pair of second separate brake line portions, respectively;
    a plurality of normally closed electromagnetic pressure relief valves which are individually interposed between the respective wheel brakes and a reservoir; and
    a regeneration cooperative braking controller which controls operations of the regenerative braking unit, the electromagnetic isolation control valves, the normally open electromagnetic pressure supply valves and the normally closed electromagnetic pressure relief valves;
    wherein the controller is configured to implement a four wheels simultaneous control mode, in which hydraulic pressures to the regeneration side left and right wheel brakes and the non-regeneration side left and right wheel brakes are controlled by:
    selectively linearly energizing the pair of electromagnetic isolation control valves while de-energizing the normally closed electromagnetic pressure relief valves corresponding to the regeneration side left and right wheel brakes and the non-regeneration side left and right wheel brakes;
    after a predetermined amount of time has elapsed, selectively linearly energizing the normally closed electromagnetic pressure relief valves corresponding to the regeneration side left and right wheel brakes while fully de-energizing the normally closed electromagnetic isolation control valves to put them in a closed state and fully de-energizing the normally open electromagnetic pressure supply valves.

2. The vehicle regeneration cooperative braking system as set forth in claim 1, wherein the controller is further configured to implement a front and rear braking pressure distribution control mode in which a braking pressure is distributed between the front wheels and the rear wheels by sequentially performing the following steps:
    a) de-energizing the normally open electromagnetic pressure supply valves corresponding to the non-regeneration side left and right wheel brakes and de-energizing the normally closed electromagnetic pressure relief valves corresponding to the non-regeneration side left and right wheel brakes while selectively linearly energizing the pair of electromagnetic isolation control valves;
    b) then, keeping the normally open electromagnetic pressure supply valves corresponding to the regeneration side left and right wheel brakes de-energized, and selectively linearly energizing the normally closed electromagnetic pressure relief valves corresponding to the regeneration side left and right wheel brakes.

3. The vehicle regeneration cooperative braking system as set forth in claim 2, wherein the controller is further configured to implement the front and rear braking pressure distribution control mode after step (b) has been completed, by:
    c) recognizing an increase in regenerative braking force by the regenerative braking unit;
    d) closing the pair of electromagnetic isolation control valves and the normally open electromagnetic pressure supply valves corresponding to the regeneration side left and right wheel brakes; and
    selectively linearly energizing the normally closed electromagnetic pressure relief valves corresponding to the regeneration side left and right wheel brakes.

4. The vehicle regeneration cooperative braking system as set forth in claim 3, wherein the controller is further configured to implement the front and rear braking pressure distribution control mode after step (c) has been completed, by:
    e) recognizing when the hydraulic pressure of the regeneration side left and right wheel brakes is lower than the hydraulic pressure of the non-regeneration side left and right wheel brakes; and
    f) selectively linearly energizing the pair of electromagnetic isolation control valves and the normally open electromagnetic pressure supply valves corresponding to the regeneration side left and right wheel brakes in response to a decrease in regenerative braking force by the regenerative braking unit.

5. The vehicle regeneration cooperative braking system as set forth in claim 4, wherein the controller is further configured to implement the front and rear braking pressure distribution control mode after step (f) has been completed, by:
    g) recognizing when the hydraulic pressure of the regeneration side left and right wheel brakes becomes equal to the hydraulic pressure of the non-regeneration side left and right wheel brakes, in response to opening of the normally open electromagnetic pressure supply valves corresponding to the regeneration side left and right wheel brakes;
    h) fully de-energizing all the normally open electromagnetic pressure supply valves and all the normally closed electromagnetic pressure relief valves; and
    i) selectively linearly energizing the pair of electromagnetic isolation control valves.

6. The vehicle regeneration cooperative braking system as set forth in claim 1, wherein the controller is further configured to implement a front and rear braking pressure distribution control mode in which a braking pressure is distributed between the left and rear front wheels and the left and right rear wheels by:
- fully de-energizing the normally open electromagnetic pressure supply valves corresponding to the non-regeneration side left and right wheel brakes and the normally closed electromagnetic pressure relief valves corresponding to the non-regeneration side left and right wheel brakes;
- fully energizing the normally open electromagnetic pressure supply valves corresponding to the regeneration side left and right wheel brakes; and
- selectively linearly energizing the pair of electromagnetic isolation control valves.

\* \* \* \* \*